US008472152B2

(12) United States Patent
Ford et al.

(10) Patent No.: US 8,472,152 B2
(45) Date of Patent: Jun. 25, 2013

(54) RECEPTACLE WITH ARC PROTECTION CIRCUITRY

(75) Inventors: Andrew Ford, Plano, TX (US); Jerry Shires, Plano, TX (US)

(73) Assignee: Unitron, L.P., Dallas, TX (US)

( * ) Notice: Subject to any disclaimer, the term of this patent is extended or adjusted under 35 U.S.C. 154(b) by 110 days.

(21) Appl. No.: 13/116,787

(22) Filed: May 26, 2011

(65) Prior Publication Data

US 2011/0230073 A1 Sep. 22, 2011

Related U.S. Application Data

(63) Continuation of application No. 12/235,332, filed on Sep. 22, 2008, now Pat. No. 7,952,840.

(60) Provisional application No. 61/052,858, filed on May 13, 2008.

(51) Int. Cl.
*H02H 3/00* (2006.01)
*H02H 7/00* (2006.01)

(52) U.S. Cl.
USPC .............................................................. 361/2

(58) Field of Classification Search
USPC ....................................................... 361/2–13
See application file for complete search history.

(56) References Cited

U.S. PATENT DOCUMENTS

| | | | |
|---|---|---|---|
| 4,271,337 | A | 6/1981 | Barkas |
| 6,678,131 | B2 | 1/2004 | Chapman et al. |
| 7,575,467 | B2 | 8/2009 | Ferguson et al. |
| 2005/0094328 | A1 | 5/2005 | Weiss et al. |

FOREIGN PATENT DOCUMENTS

| | | |
|---|---|---|
| JP | 2004327247 | 11/2004 |
| JP | 2004349081 | 12/2004 |

OTHER PUBLICATIONS

Paek, Heyong Yeol, Written Opinion of the International Searching Authority, International Application No. PCT/US2009/043366, dated Dec. 24, 2009.

Paek, Heyong Yeol, International Search Report, International Application No. PCT/US2009/043366, dated Dec. 24, 2009.

*Primary Examiner* — Rexford Barnie
*Assistant Examiner* — Christopher Clark
(74) *Attorney, Agent, or Firm* — Howison & Arnott, L.L.P.

(57) ABSTRACT

An electrical receptacle includes at least one motion sensor for detecting movement of a blade of an electrical plug in the receptacle, an extraction detector operatively connected to the motion sensor for generating a signal in response to movement of the blade at a predetermined rate, a position detector operatively connected to the motion sensor for determining the position of the blade in the receptacle, a switch operatively connected to the extraction detector and the position detector for de-energizing the receptacle when the extraction detector detects extraction of the blade from the receptacle at a rate equal to or greater than the predetermined rate and wherein the extraction detector and switch are operative to de-energize the receptacle in less than six milliseconds when the extraction detector detects extraction of the blade from the receptacle at a rate equal to or greater than the predetermined rate.

17 Claims, 6 Drawing Sheets

RECEPTACLE WITH ARC PROTECTION CIRCUITRY

CROSS-REFERENCE TO RELATED APPLICATIONS

This application is a continuation of U.S. patent application Ser. No. 12/235,332, filed Sep. 22, 2008, entitled RECEPTACLE WITH ARC PROTECTION CIRCUITRY, which claims benefit of U.S. Provisional Application No. 61/052,858, filed May 13, 2008, entitled RECEPTACLE WITH ARC PROTECTION CIRCUITRY, the specifications of which are incorporated herein in their entirety.

TECHNICAL FIELD

The invention relates to an electrical receptacle including high-speed arc suppression and in particular to an electrical receptacle for use in environments where an explosive atmosphere may develop.

BACKGROUND

When an electric plug is pulled from a receptacle under load, energy in the form of inductance in the load and associated wiring may cause an arc between the plug blade and receptacle contact at the tip of the plug blade. In environments where an explosive atmosphere may develop due to the presence of explosive vapors or gasses, such an arc could serve as an ignition source.

Electrical receptacles for preventing inadvertent electric shocks and for arc protection have been proposed. These receptacles have typically employed a mechanically actuated switch to sense the presence of a plug blade in the receptacle. When the plug is inserted into the receptacle to a predetermined position, a plug blade contacts the switch, closing a relay in series with the receptacle contacts to provide power to the receptacle. When the plug is removed from the receptacle, the switch opens as the blade is retracted past the predetermined position, opening the relay to de-energize the receptacle before the plug blade is completely separated from the receptacle contacts. However, these devices have several drawbacks. The energy in the load inductance may cause arcing across the relay contacts. The inductance of the relay coil may also cause an arc across the switch contacts. Thus, a sealed relay and a sealed switch would be required in environments where there is a potential for an explosive atmosphere to develop.

Moreover, mechanical switches and relays also have a relatively slow response time. Testing has demonstrated that in one case a standard three-pronged plug may be removed from a receptacle in as little as six milliseconds. This could occur if the power cord or plug is inadvertently jerked from the receptacle, for example if a person accidentally tripped on the cord, kicked the plug or if the cord is entangled by a piece of moving machinery. If the switch/relay combination does not de-energize the receptacle within this short time, an arc may occur between the plug blade and the receptacle contacts as the plug is removed from the receptacle. Thus, there exists a need for an electrical receptacle with arc protection that is capable of rapidly de-energizing the receptacle in the event that a plug is jerked or rapidly removed from the receptacle without a resulting arc.

SUMMARY

The present invention disclosed and claimed herein, in one aspect thereof, comprises an electrical receptacle with arc prevention circuitry including a receptacle body with a plurality of contacts mounted therein for contacting the blades of an electrical plug inserted in the receptacle with at least one motion sensor mounted in the receptacle body for detecting movement of a blade of an electrical plug in the receptacle and outputting a signal in response thereto. An extraction detector is connected to the motion sensor for generating a pulse signal in response to movement of the blade in the receptacle at a predetermined rate. A position detector is also connected to the motion sensor for determining the position of the blade in the receptacle. In one embodiment, the motion detector is a linear potentiometer and the extraction detector comprises a pulse generator circuit connected to the potentiometer and to a monostable vibrator circuit (one shot).

A switch operatively connected to the extraction detector and the position detector de-energizes the receptacle when 1) the extraction detector detects extraction of the blade from the receptacle at a rate equal to or greater than the predetermined rate or 2) when the position detector detects movement of the blade past a predetermined position in the receptacle. A shunt is connected to the switch to dissipate load energy when the switch de-energizes the receptacle. The extraction detector and switch are operative to de-energize the receptacle in less than six milliseconds when the extraction detector detects extraction of the blade from the receptacle at a rate equal to or greater than the predetermined rate. In one embodiment, the switch consists of MOSFET and/or IGBT transistors and the shunt is a metal oxide varistor or similar device connected across the transistors.

In another variation, an arc protector for use with an electrical receptacle includes an extraction detector operatively connected to a sensor mounted in the electrical receptacle. The sensor detects movement of an electrical plug engaged with the receptacle and outputs a signal to the extraction detector which in turn generates a pulse signal in response to movement of the plug at a predetermined rate of extraction from the receptacle. A position detector operatively connected to the sensor determines the position of the plug in the receptacle. A switch connected to the extraction detector and the position detector de-energizes the receptacle when 1) the extraction detector detects extraction of the plug from the receptacle at a rate equal to or greater than the predetermined rate or 2) when the position detector detects movement of the plug past a predetermined position in the receptacle. The arc protector is operative to de-energize the receptacle in less than six milliseconds.

In another aspect, an electrical receptacle with arc prevention circuitry includes a receptacle body having a plurality of receptacles having contacts mounted therein for receiving and contacting respective ones of the blades of an electrical plug, wherein the blades can be inserted therein or extracted therefrom. At least one motion sensor mounted on the receptacle body detects movement as a rate of change of physical displacement of the electrical plug relative to the receptacle and outputs a signal in response thereto. In one variation, the motion sensor detects movement of at least one of the blades relative to the associated contact. The motion sensor may be a linear potentiometer with a wiper output that is physically interfacable with at least one of the blades when inserted in the respective receptacle such that movement of the wiper causes a change in a voltage output.

An extraction detector operatively connected to the motion sensor generates a signal in response to movement of the electrical plug in an extraction direction. A switch operatively connected to the extraction detector and the position detector de-energizes the receptacle when the extraction detector detects motion of the electrical plug from the receptacle in an extraction direction. The extraction detector is thus operative to de-energize the receptacle when the extraction detector detects extraction of the electrical plug from the receptacle as a result of motion of the electrical plug in the extraction direction. In one variation, the extraction detector is operable to detect when the motion sensor detects movement that equals or exceeds a predetermined rate of movement.

In another aspect, an insertion sensor detects a position of at least one of the blades relative to the contacts and inhibits the switch until the at least one blade is inserted at or past a predetermined position. In this regard, the electrical plug may have three prongs, a neutral blade, a hot blade and ground blade, wherein the hot and neutral blades are associated with the hot and neutral terminals of an AC supply and the ground is adaptable to be connected to earth ground, and wherein at least one blade of which movement is detected by the motion sensor comprises the neutral blade. The switch may be operable to selectively connect the hot blade to the AC supply and the neutral blade polarized relative to the hot blade and the receptacles configured to require the neutral blade to be inserted in the correct receptacle.

BRIEF DESCRIPTION OF THE DRAWINGS

For a more complete understanding, reference is now made to the following description taken in conjunction with the accompanying Drawings in which.

DETAILED DESCRIPTION

Figure 1:
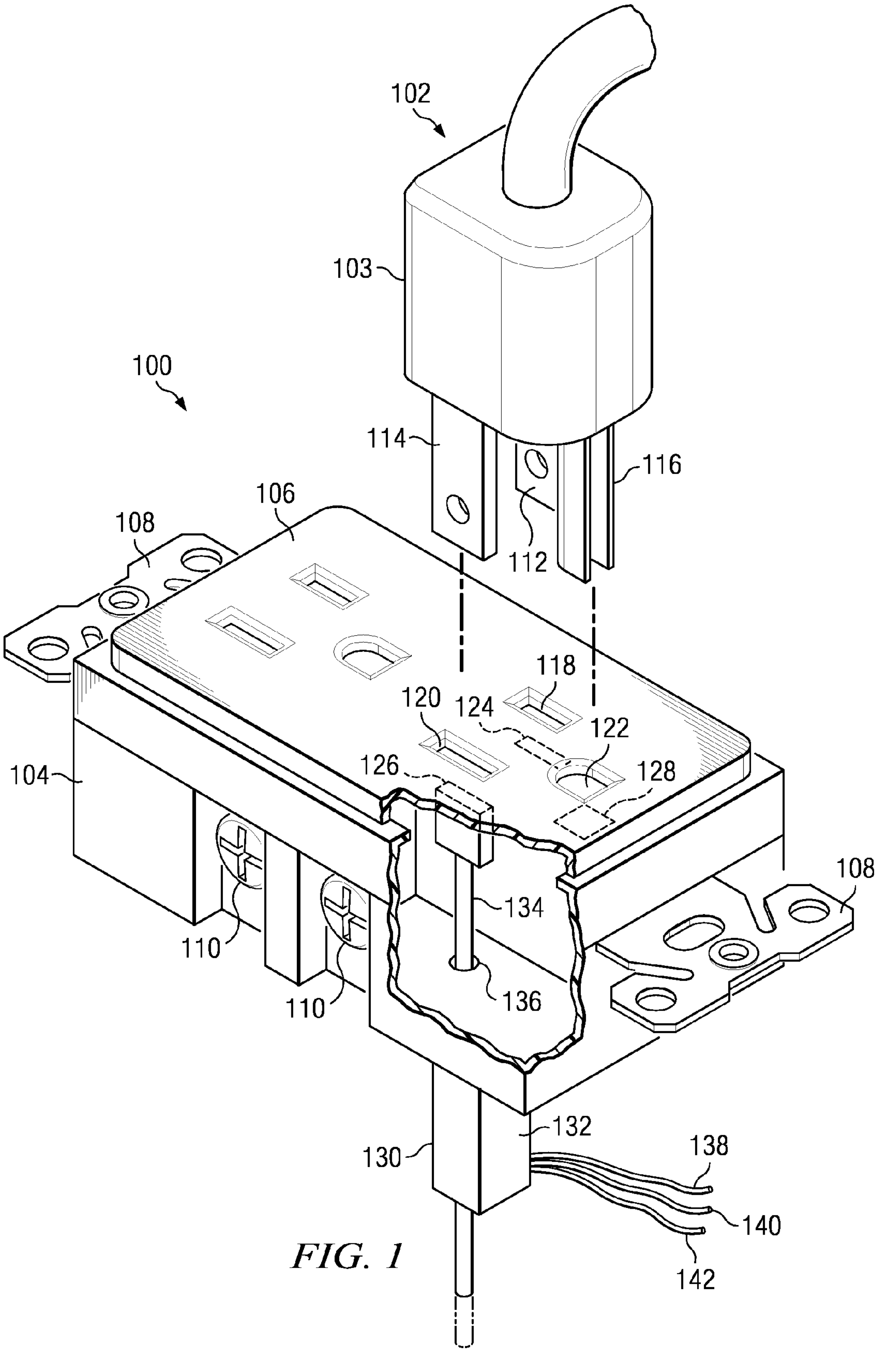
FIG. 1 illustrates one embodiment of an electrical receptacle according to the disclosure.

Referring now to the drawings, wherein like reference numbers are used herein to designate like elements throughout, the various views and embodiments of an electrical receptacle with arc protection circuitry are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a perspective view of a duplex receptacle 100 in accordance with the disclosure which is partially cut-away to disclose certain features of the receptacle. Receptacle 100 is configured to receive a conventional plug 102 and includes a body 104, non-conductive cover plate 106, mounting brackets 108 and wiring terminals 110. Plug 102 is of conventional design and includes a non-conductive body 103 and first, second and third blades 112, 114 and 116 comprising hot, neutral and ground contacts, respectively. Cover 106 is formed with slots 118, 120 and 122 for receiving blades 112, 114 and 116. Hot, neutral and ground contacts 124, 126 and 128 mounted in body 104 of receptacle 100 contact blades 112, 114 and 116 when the blades are inserted into the receptacle. In one embodiment, bracket 108 is the ground and is connected to contact 128. Contacts 124, 126 and 128 may be conventionally connected to terminals 110 and to a ground terminal and bracket 108. However, it should be understood that the disclosed configuration relates to a receptacle/plug configuration for a US standards based receptacle/plug, and that adaptation to other standards, such as those in Europe and other foreign countries, is anticipated. For example, France has a 2 or 3-prong 230 Volt receptacle/plug configuration whereas The UK has a 3-prong 250 Volt configuration.

Referring still to FIG. 1, there is illustrated one embodiment of the disclosed device, which includes a linear potentiometer 130 having a housing 132 and spring loaded wiper shaft 134 mounted in the housing. Potentiometer 130 is mounted on the rear side of body 104 of receptacle 100 with wiper shaft 134 extending into the receptacle body through an aperture 136. Aperture 136 is aligned with slot 120 such that neutral blade 114 of plug 102 contacts the end of wiper shaft 134 and depresses the shaft into housing 132 of potentiometer 130 as the blade enters the receptacle. Potentiometer 130 is provided with ground, wiper and reference voltage lead wires 138, 140 and 142. As set forth in greater detail below, the signal from potentiometer 130 is used to detect motion of neutral blade 114 as the blade is removed or inserted into receptacle 100, i.e., it detects a change in voltage and that is converted into a dv/dt value. The top end of the potentiometer is connected to a reference voltage and the lower end is connected to the circuit common (neutral). The potentiometer wiper detects the voltage along the resistor. The voltage indicates the position of blade 114 and the wiper blade.

As illustrated, potentiometer 130 is mounted on the rear side of body 104 of receptacle 100 with wiper shaft aligned with slot 120 such that neutral blade 114 of plug 102 contacts the end of wiper shaft 134 when plug 102 is inserted into the receptacle. However, in other variations potentiometer 130 may be mounted at different locations on body 100 and/or configured to contact different portions of plug 102. For example, potentiometer 130 could be configured with a wiper shaft 134 that extends though the face plate 106. In this variation, the wiper shaft would be depressed by the body 103 of the plug rather than by blade or prong of the plug. Other variations are possible.

Figure 2:
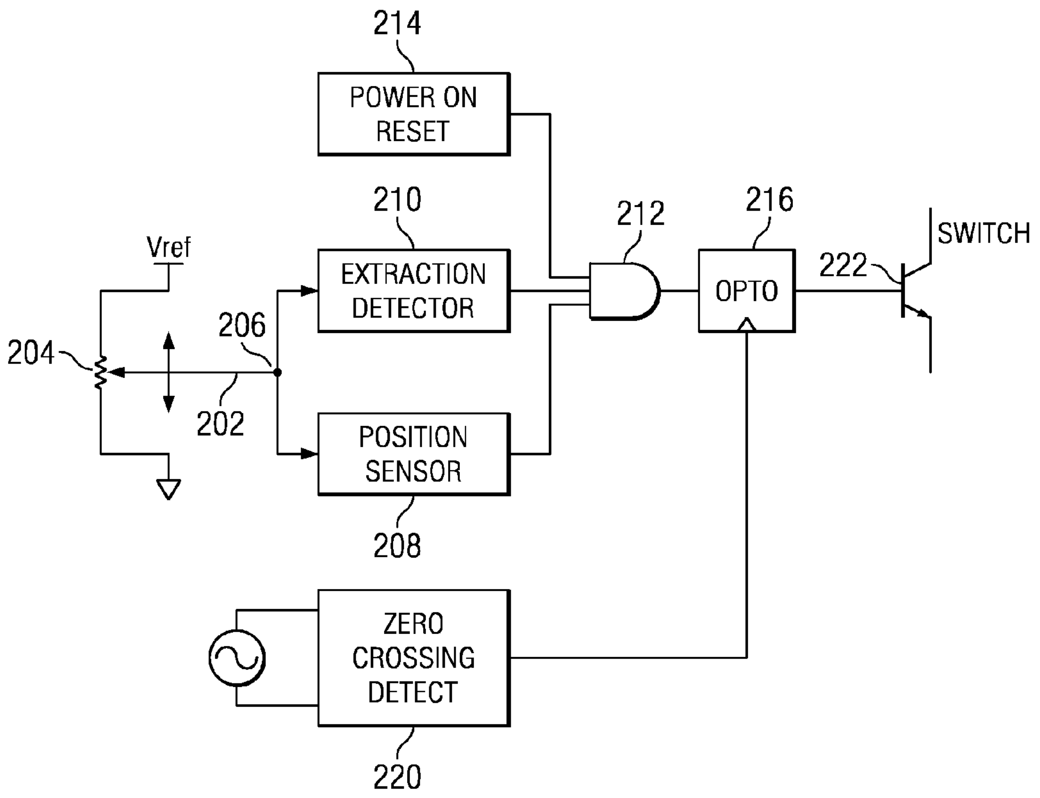
FIG. 2 is a block diagram of circuitry for a receptacle including motion sensing and position sensing functionalities.
Figure 3A:
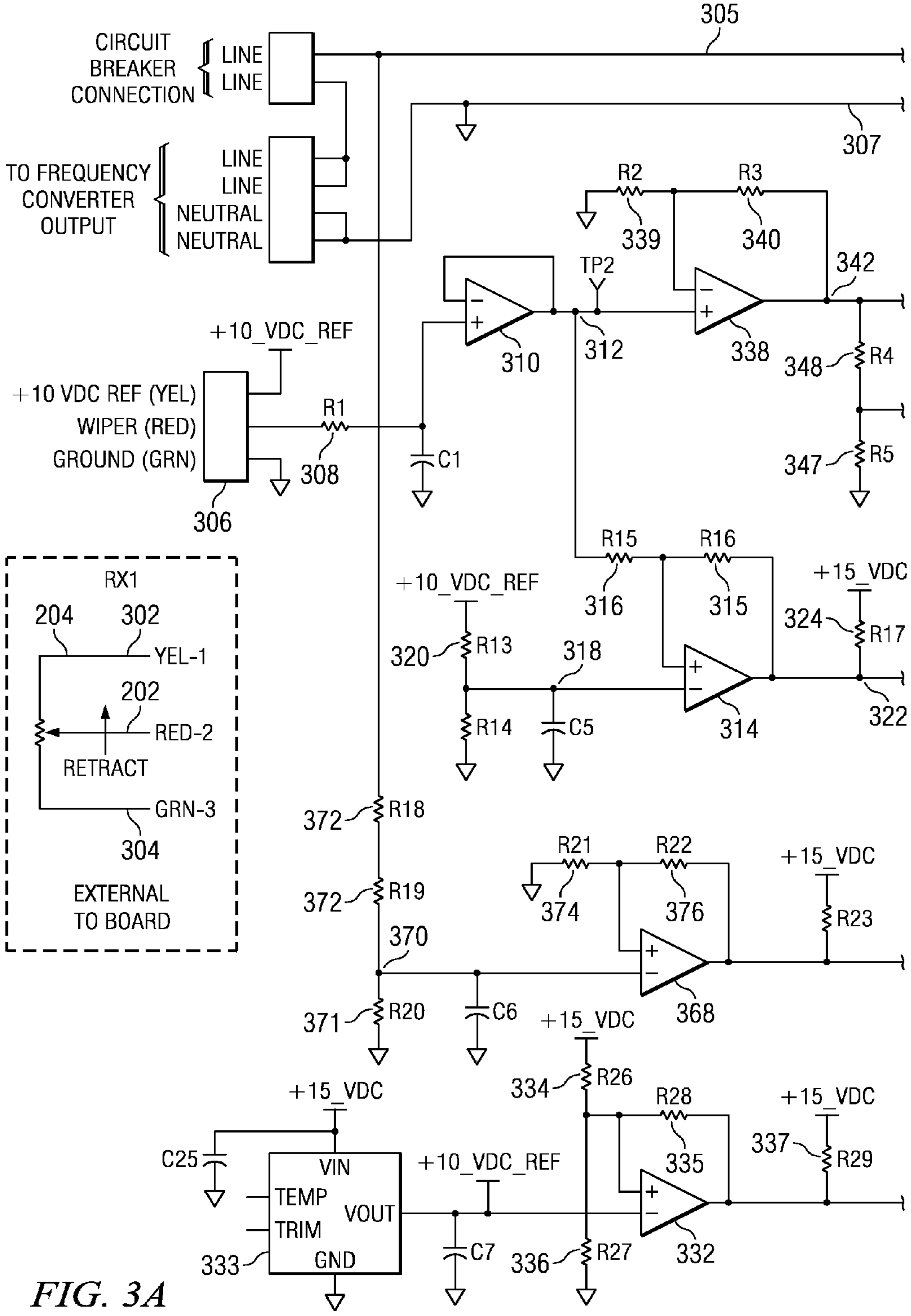
FIGS. 3A-3C illustrate schematic diagrams of circuitry for implementing the motion sensing and position sensing functionalities.
Figure 3B:
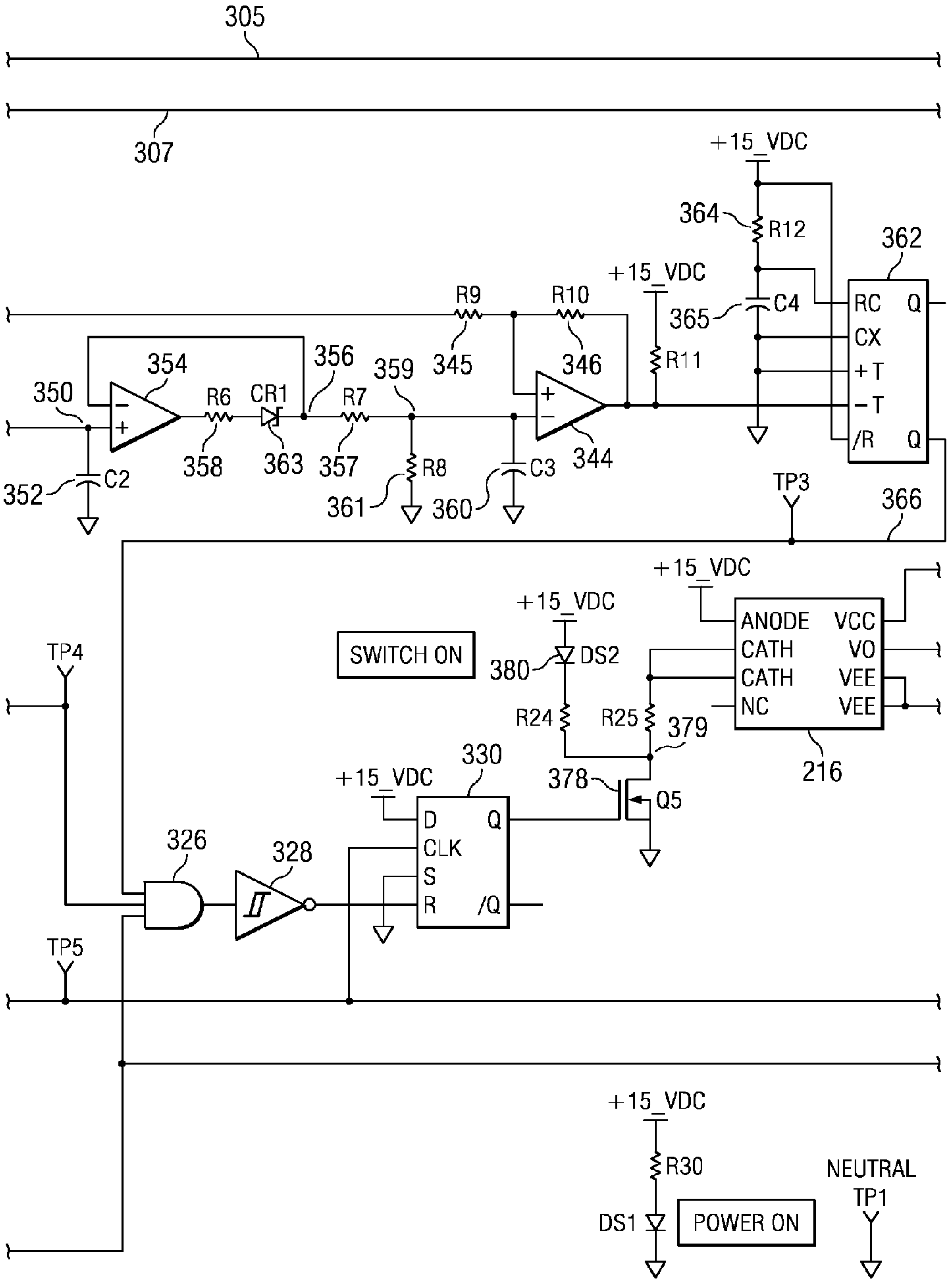
Figure 3C:
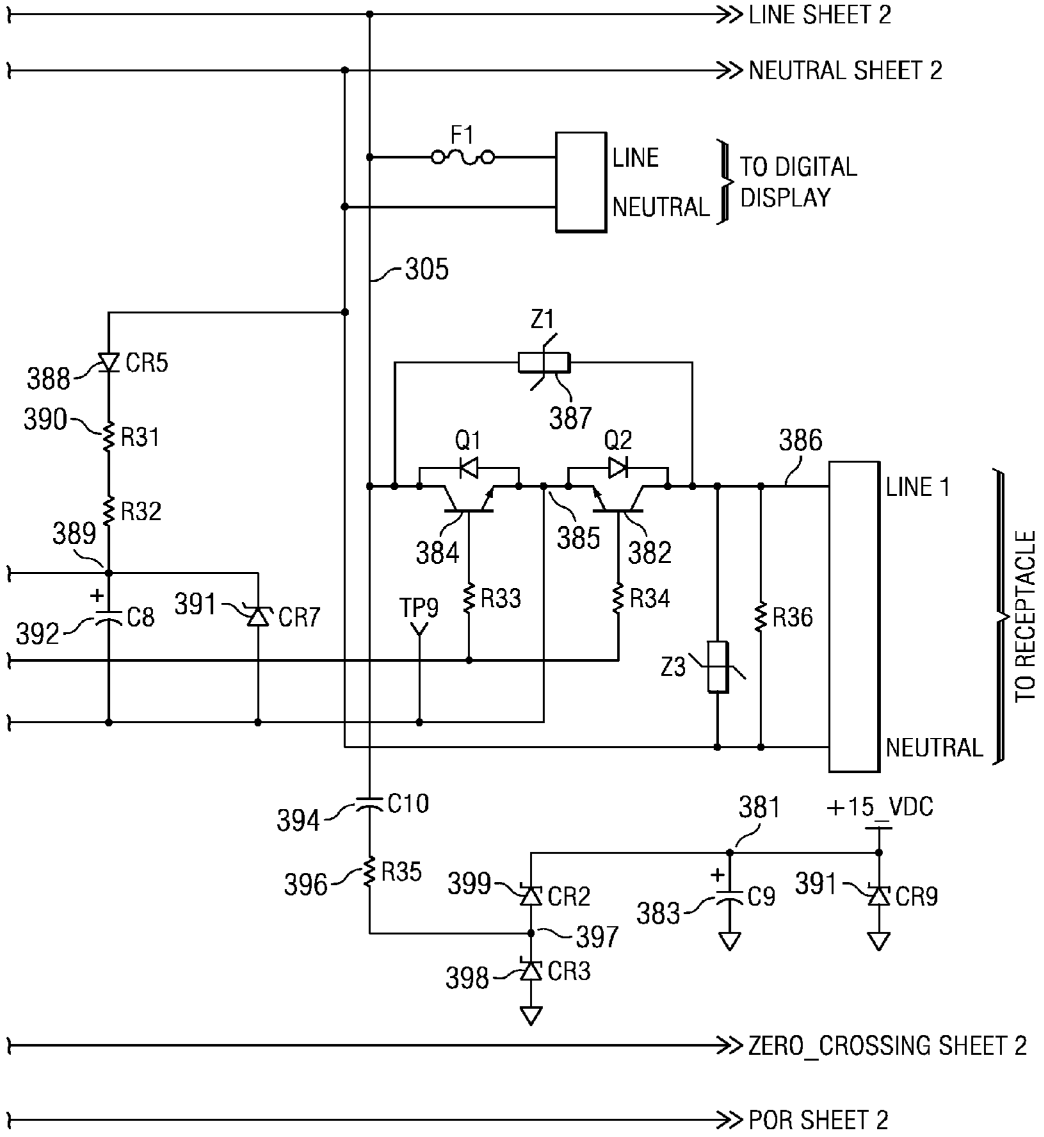

Referring now to FIG. 2, there is illustrated a block diagram of the switch control circuitry for turning switch 222 on and off to energize or de-energize an electrical receptacle. The switch control circuitry is operable to sense the position of a wiper 202 on a pot 204. The pot 204 is connected between a positive and a neutral terminal. The wiper 202 is connected to a node 206 to provide a divided down voltage therefrom. The wiper 202 will move towards neutral when the blade 114 is extracted from the receptacle 100 (i.e., traverses a linear path outward from the receptacle 100) and moves towards the positive voltage when the blade 114 is inserted into the receptacle 100 (i.e., traverses a linear path inward into the receptacle 100). Thus, the voltage on node 206 will increase when the electrical plug is inserted into the receptacle and will decrease when it is extracted therefrom. The voltage at 206 is thus indicative of the position of blade 114. It should be noted that all prongs or blades on a particular plug are not necessarily identical, i.e., some can be shorter and some can be longer. Thus, the final position of the wiper 202 may be slightly different for different plugs.

The switch control circuitry includes a power on reset block 214, an extraction detection block 210, a blade position sensing block 208 and a zero crossing detection block 220. The output signals from each of power on reset block 214, extraction detection block 210 and the blade position sensing block 208 are transmitted to an AND gate 212 which controls the operation of switch 222 to energize and de-energize an electrical receptacle depending upon the relative states thereof, as will be described hereinbelow. It should be understood the present disclosure describes the control functionality as being realized with the use of combinatorial logic, but it can equally be realized with an instruction based processor or with a state machine utilizing a microcontroller.

Position sensor 208 detects that the plug has been inserted into the receptacle far enough to be considered “in” for the purpose of turning power switch 222 on. When the “in” position is detected, power switch 222 will turn on at the next negative going zero voltage crossing. Turning switch 222 on at complete insertion of the plug and at the zero voltage crossing prevents surge currents due to high dv/dt on the output voltage and any chance of creating an arc due to the surge or in response to a “teaser” insertion. In the case where a plug is extracted slowly enough that extraction detector 210 is non-operative, position detector 208 will turn power switch 222 off before separation of the plug blades from the receptacle contacts.

Referring to FIGS. 2 and 3*a*-3*c*, the voltage on the node 206 is sensed by a position sensor 208, which determines the relative position of the wiper 202 along the length of the pot 204. The position sensor 208, as will be described hereinbelow, will result in a positive output when the plug is inserted into the receptacle and the prong passes a certain position. An extraction detector 210 is also connected on one side to node 206 to determine when the wiper is moved towards neutral at a certain speed. The linear potentiometer 204 has the end leads 302 and 304 connected through a connector 306 to +10 VDC and neutral, respectively, and the wiper 202 connected through the connector 306 to one side of a resistor 308. The other side of the resistor 308 is connected to the positive input of an op amp 310 with a capacitor 311 connected between the positive input and neutral. The negative input of the op amp is connected to the output to provide unity gain therefore, with the output of the op amp 310 driving a node 312. This op amp 310 is a buffer circuit.

With respect to the position sensor 208, it is realized with a comparator 314. A reference voltage is provided with a resistive divider 320 connected between a +10 VDC reference voltage and neutral, with the divided voltage provided on a node 318. In one embodiment, a potentiometer (not shown) may be added to resistive divider 320 to provide an adjustment for position sensing to compensate for variations in the position of potentiometer 130 (FIG. 1) on receptacle 100 due to manufacturing tolerances or other variations. Node 318 is connected to the negative input of the comparator 314 to provide the reference voltage. The voltage on node 312 is connected to the positive input of the comparator 314 through a resistor 316, with a feedback resistor 315 connected between the positive input and the output. Hysteresis caused by resistors 315 and 316 sets the difference between “in” and “out” positions of blade 114 of plug 102 (FIG. 1). When the wiper 202 moves towards the positive voltage and the voltage on the positive input of comparator 314 exceeds the voltage on node 318, then the output of the comparator 314 on node 322 will go to high. This is facilitated with a resistor 324 provided to “pull-up” the voltage on node 322 to a voltage level of 15V when the comparator output is not actively pulling the output towards neutral. Thus, the output of comparator 314 is an open-collector output. This node 322 is input to one input of a three-input AND gate 326. The output of this AND gate 326 is input through an inverter 328 to the reset input of a d- type flip flop 330. This gate 326 corresponds to the gate 212 in FIG. 2. Conversely, when the wiper 202 moves towards neutral, indicating an extraction operation, the voltage on node 312 will decrease and, when it falls below the reference voltage on node 318, the voltage on node 322 will be pulled low.

The power on reset circuit 214 is realized with a comparator 332 which has a negative input thereof connected to the voltage output of a voltage regulator 333. Voltage regulator 333 has the voltage input thereof connected to a +15V regulated power supply voltage and this provides the +10 VDC reference voltage described herein above, which is connected to the negative input of comparator 332. The positive input of comparator 332 is connected to a reference voltage provided by a resistive divider comprised of a resistor 334 and a resistor 336 connected between the +15 VDC power supply and neutral. This ratio is approximately 20:4. The positive input is connected to the output through a feedback resistor 335 with the output of comparator 332 connected to the +15V power supply through a pull up resistor 337. The output of comparator 332 is input to the second input of the gate 326.

In operation, when the system is powered up, the +15 VDC power supply voltage increases from neutral to +15 VDC. When the voltage input to regulator 333 rises above +10 VDC, the output will be regulated to +10 VDC. Since the +15 VDC level is not at the full voltage level, the positive input of the comparator 332 will be below the +10 VDC reference voltage, resulting in the output of comparator 332 remaining low. It is only when the +15 VDC power supply voltage level approaches full value that the output of comparator 332 will go high. This effectively disables gate 326 until the power levels have risen to the static levels of operation.

The extraction detector 210 is comprised of the combination of a pulse generator and a pulse stretcher. The pulse generator generates the pulse any time a change in the voltage on node 312 occurs in the correct direction, this indication a change in voltage with respect to time—dv/dt. Node 312 is connected to the positive input of an amplifier buffer 338, the negative input connected to neutral through a resistor 339 and to the output thereof through a resistor 340. This basically provides gain function. The output of isolator 338 is connected to a node 342. Node 342 is connected to the input of a comparator 344 through a resistor 345. The positive input of comparator 344 is connected to the output thereof through a resistor 346. The ratio of resistor 346 to 345 is large, resulting in a comparator operation with hysteresis.

The negative input of comparator 344 is connected to a delay circuit. The delay circuit is comprised of a resistive divider including a resistor 347 and a resistor 348 connected between node 342 and neutral. The ratio is such that resistor 347 is in a ratio with resistor 348 of 100:5. This results in approximately a voltage on a tap node 350 of the divider of 95% of the voltage on node 342. Node 350 is connected to neutral through a capacitor 352 and also to the positive input of a buffer 354. The negative input of buffer 354 is connected to a node 356. The output of buffer 354 is connected through a resistor 358 to anode of a Schottky diode 363, the cathode thereof connected to the node 356. As such, a current will only be conducted when the voltage on node 350 is positive relative to node 356.

Node 356 is connected through a resistor 357 to a node 359 which is connected to neutral through a capacitor 360 and also to neutral through a resistor 361. Capacitor 360 is charged through resistor 358 and resistor 357, resistor 358 being much larger than resistor 357, such that resistor 358 primarily defines the RC time constant for the charging operation. Resistor 361 is approximately 100 times larger than resistor 358. Thus, the RC time constant for the resistor 361 and capacitor 360 comprises an RC time constant for the delay. Whenever the voltage on node 342 rises, the positive input of comparator 344 will be pulled above the negative input, which lags the positive input due to the requirement that the capacitor 360 has to charge through the resistor 358, causing a rise in the voltage on node 356. However, in a static state, the voltage on node 359 will also always be smaller than the voltage on node 342 as a result of the resistive divider comprised of resistors 348 and 347. As a voltage increase occurs due to the wiper 202 being pulled towards the positive voltage, i.e., the plug is being placed in the receptacle, this will result in the capacitor 360 being charged through resistor 358 and diode 363. When the opposite occurs, i.e., when the receptacle is being extracted and the wiper 202 is moving towards neutral, the voltage on node 342 will go low, causing the output of amplifier 354 to go low, which will pull the anode of diode 363 low relative to the node 356, which will result in no current flowing through resistor 357, due to the diode 363 being back biased. This will result in the voltage on capacitor 360 decaying through resistor 361, but this will only cause the voltage on the negative input of comparator 344 to fall slower than the voltage on the positive input thereof. As such, what will occur is that the voltage on the positive input of comparator 344 will fall below the voltage on the negative input, resulting in a negative output pulse, the width value being defined by the RC time constant of resistor 361 and capacitor 360.

The negative pulse output of comparator 344 is connected to the negative trigger input of a one-shot 362. As a result, it will be triggered only on negative going pulses and not on positive going pulses. The positive going pulse input is connected to neutral and the reset input is connected to +15V. Thus, the one-shot 362 will only be triggered on a negative going pulse and not on a positive going pulse. The time constant for the one-shot is defined by a resistor 364 connected between the +15 VDC supply voltage and an RC input where a capacitor 365 is connected between the RC input and the CX input, which is connected to neutral. The pulse output is provided on the Q-bar output 366. This provides a negative going pulse with a width defined by the capacitor 365 and resistor 364. This is input to the third input of the gate 326. Thus, whenever there is no negative going pulse on the output of comparator 344, i.e., 1) there is no change in the voltage detected as a result of extraction of the plug, 2) the position sensor indicates that the plug is in the receptacle and 3) the power on reset indicates that a voltage is stable, the output of the gate 326 will be high and the output of inverter 328 will be low to the reset input of the flip flop 330. This is active high reset. The output of the flip flop 330 will be clocked high every time a negative going zero crossing is detected by the zero crossing detector 220 while the reset input thereof is held high by the gate 326 in the static state as a result of there being a plug in the receptacle and there having been no movement of the plug in the extraction direction detected.

The zero crossing detector 220 is realized with a comparator 368 having a negative input thereof connected to a tap 370 on a resistive divider comprised of a resistor 371 connected between tap 370 and neutral and a resistor 372 connected between tap 370 and the hot side line 305. The positive input of comparator 368 is connected to neutral through a resistor 374, with a resistor 376 connected between the positive input and the output thereof, such that the output thereof will go high whenever the high side voltage on line 305 falls below 0V. This provides a clock input to the flip flop 330.

The output of the flip flop 330 drives the gate of a transistor 378 which is connected between a node 379 and neutral. Node 379 is connected to the cathode of an LED 380, the anode thereof connected to a positive voltage. Whenever the node 379 is connected to neutral, the LED is illuminated. This indicates that the switch is on. Node 379 is connected to the input of the optocoupler 216. The output of the optocoupler is connected to the gates of two switches 382 and 384. Transistors 382 and 384 have the emitters thereof connected together to a node 385 which is connected to the VEE of optocoupler 216. Therefore, when the input of optocoupler 216 is pulled low, this will drive the output of optocoupler 216 high towards the VCC of optocoupler 216 which is node 389. Since the output of optocoupler 216 is connected to the gates of transistors 382 and 384, the output driven high will cause the gates of transistors 382 and 384 to be high with respect to node 385. This will cause the switches to conduct. The collectors of transistor 384 and 382 are connected between the high side line 305 and an output high side 386. This is the hot side of the receptacle. MOV device 387 is connected across the two transistors 384 and 382 and the collectors thereof. As such, when transistors 382 and 384 are turned off, i.e., the voltage on the gates thereof is removed with respect to node 385, the MOV 387 will conduct to allow the load energy to be dissipated into MOV 387.

The power supply for the optocoupler 216 is provided by a half-wave rectifier circuit comprising a diode 388 connected between the low side 307 and a node 389 through resistors 390, a capacitor 392 connected between node 389 and the VEE pin. A zener diode 391 is connected between node 389 and the VEE pin. This provides a +15 VDC power supply voltage, as the zener diode 391 is a 15V zener diode. This supply is used to power on semiconductor switches 384 and 382.

A second supply is provided by coupling the high side line 305 through a capacitor 394 and a series connected resistor 396 to a node 397. A first diode 398 is reverse bias connected between node 397 and neutral with the anode thereof connected to node 397. A second diode 399 is connected between node 397 and a node 381 with the anode thereof connected to node 397. A capacitor 383 is connected between node 381 and neutral. A 15V zener diode 391 is connected between node 381 and neutral, providing the +15V power supply voltage to the overall control operation.

In operation, when the plug is placed into the receptacle, the position sensor comparator 314 will detect such and will cause the output thereof to go high, causing the reset input on the flip flop 330 to go low. On the next zero crossing detection, the data input of flip flop 330, which is connected to a +15V supply, will be clocked through. This will turn the switch on. Whenever a change in the resistor value is detected in a particular direction, i.e., the voltage decreases indicating the wiper 202 is moved towards the neutral side indicating extraction, the one-shot will generate a pulse that will disable the gate 326 which will pull the reset high on flip flop 330, turning the switch off. This detection of the extraction step is an operation whereby "movement" is detected of the plug in a particular direction—that of extraction—and this movement can be detected from any position within the receptacle. Therefore, it is not important that the blade be fully inserted into the receptacle, as this is not a detection of a change in position from a fully inserted position to a not fully inserted position; rather, it is a detection of movement in the direction of extraction that is detected.

Referring again to FIG. 2, since the control functionality is realized with the use of combinatorial logic, it will be appreciated that a NAND gate and/or other logic devices may be substituted for AND gate 212. It will also be appreciated that comparators described in connection with FIGS. 3A-3C may be replaced with op-amps. Other substitutions and variations are possible.

Figure 4:
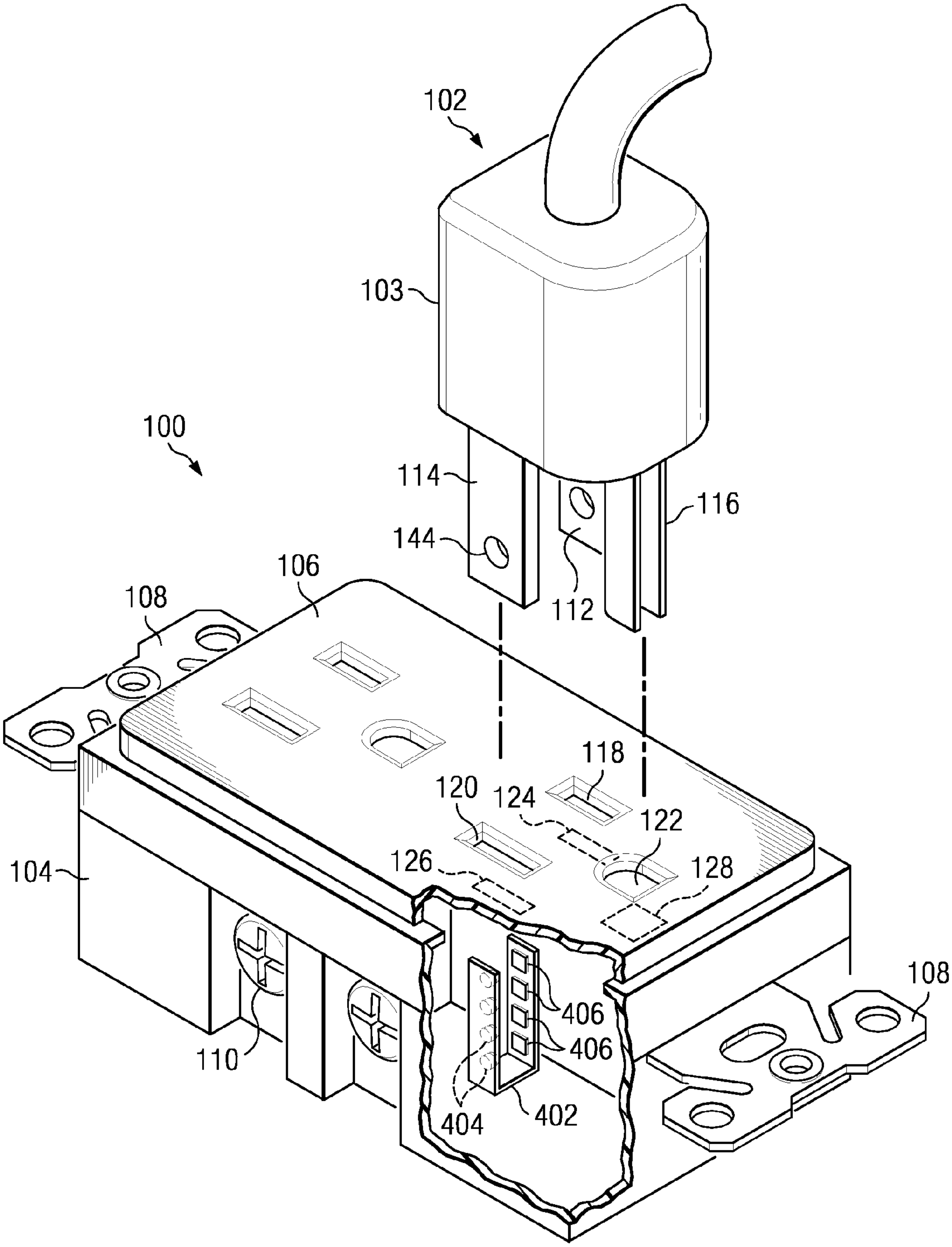
FIG. 4 is a second embodiment of an electrical receptacle according to the disclosure.

Turning to FIG. 4, in an alternate variation, potentiometer 130 is replaced with an optical motion sensor 402 for detecting the motion of blade or prong 114. Optical motion sensor 402 includes one or more light sources 404 such as light emitting diodes (LEDs) mounted in receptacle 100. A plurality of light detectors 406, such as photodiodes, are also mounted in receptacle 100. In one embodiment a linear array of closely-spaced light detectors 406 are provided. As illustrated, light detectors 406 are mounted in receptacle 100 such that blade 114 passes between light sources 404 and the light detectors as blades 112, 114 and 116 of plug 102 are inserted into the receptacle. In one embodiment, light sources 404 are powered by a separate circuit connected to a separate power source such that the light sources are continuously powered and illuminated.

When blade 114 is inserted into receptacle 100, the blade interrupts the transmission of light from light source 404 to the uppermost light detector 406. As aperture 144 in blade 114 passes outermost light detector 406, the detector will again sense the light emitted from light source 404 until the aperture travels completely past the sensor. Thus, each of light detectors 406 will be successively turned off, on and off as the blade 114 moves farther into the receptacle. When blade 114 reaches a predetermined location in receptacle 100, position sensor 208 of FIG. 2 will be enabled, either by means of a counter connected to light detectors 406 that determines the number of detectors turned on and off or when a specific one of light detectors 406 is turned on and off. With the power on reset, extraction detector and position sensor signals all enabled to gate 212, the output from the gate closes switch 222, energizing receptacle 100. Conversely, when plug 102 is removed from receptacle 100, the position sensor signal to gate 212 will be switched, either by means of a counter or when aperture 144 passes a specific one of light detectors, changing the output of the gate and opening switch 222.

When plug 102 is retracted from receptacle 100, aperture 144 in blade 114 will pass sequentially across light detectors 406, turning the detectors on and off in succession. A timer or time detecting circuit (not shown) is used to measure the time interval between the successive switches (off-on-off) of adjacent or selected ones of light detectors 406. If the time interval between switches is below a predetermined threshold value, indicating that plug 102 is being jerked or rapidly extracted from receptacle 100, the timing circuit will transmit an extraction detection output signal that changes the input to AND gate 212 (FIG. 2), for example by means of a flip-flop circuit. When the extraction detector signal to gate 212 is changed, the output from AND gate 212 is changed, opening switch 222 to de-energize the receptacle.

In another variation, light sources 404 and light detectors 406 may be mounted in a housing external to receptacle 110, similar to housing 132 of FIG. 1. In this embodiment, a spring loaded shaft or bar, similar to shaft 134 of FIG. 1 is used to interrupt transmission of light between light sources 404 and light detectors 406 when the shaft is depressed or released as blade 114 is inserted or extracted from the receptacle.

The receptacles with arc protection devices described above are capable of de-energizing rapidly if a plug is jerked from the receptacle. As previously noted, empirical testing indicates that a plug can be jerked from the receptacle, breaking the contact between the plug blades and the receptacle contacts in as little as six milliseconds. The receptacles and arc protection devices disclosed herein can de-energize the receptacle in less than six milliseconds. In one embodiment, the receptacle is de-energized in less than 4 milliseconds; in another, less than two milliseconds.

It should be understood that any type of device that is capable of measuring movement of one or more of the blades in an extraction direction could be utilized. Although the movement described herein above utilized either a linear resistor whose movements were converted into signals or opto devices that required no movement, other devices could be utilized. For example, a single axis accelerometer could be disposed on a flexible member that is contacted by the blade when inserted, such that it will flex over a range of linear travel of the blade. The accelerometer can be disposed on the end thereof and detection of movement of the flexible member in a particular direction will indicate movement of the blade in a particular direction.

It will be appreciated by those skilled in the art having the benefit of this disclosure that this receptacle with arc protection circuitry provides high-speed arc protection. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An electrical receptacle with arc prevention circuitry, including:

a receptacle body including a plurality of contacts mounted therein for receiving and contacting the blades of an electrical plug inserted in the receptacle;

a zero voltage crossing detector, the zero voltage crossing detector preventing current surges upon insertion of the blades of the electrical plug in the receptacle;

at least one motion sensor mounted on the receptacle, the motion sensor detecting movement of a blade of the electrical plug in the receptacle relative to the contacts and outputting a signal in response thereto;

an extraction detector operatively connected to the motion sensor, the extraction detector generating a signal in response to movement of the blade;

a position detector operatively connected to the motion sensor for determining the position of the blade in the receptacle;

a switch operatively connected to the extraction detector and the position detector; and wherein the extraction detector and switch are operative to de-energize the receptacle when the extraction detector detects extraction of the blade from the receptacle at a rate equal to or greater than a predetermined rate.

2. The electrical receptacle of claim 1, further comprising a shunt operatively connected to the switch, the shunt dissipating load energy when the switch de-energizes the receptacle.

3. The receptacle of claim 2, wherein the shunt comprises a metal oxide varistor.

4. The receptacle of claim 1 wherein the motion sensor comprises a potentiometer.

5. The electrical receptacle of claim 1, wherein the motion sensor comprises a linear potentiometer for generating a variable voltage change that is correlated to sensing movement of a blade of the plug in the receptacle.

6. The electrical receptacle of claim 1, wherein the position detector and the extraction detector are operatively connected to the switch with an AND gate.

7. The electrical receptacle of claim 1, wherein the extraction detector comprises a pulse generator circuit connected to a potentiometer and to a monostable vibrator circuit.

8. The electrical receptacle of claim 1, wherein the switch comprises one of MOSFET and IGBT transistors.

9. An arc protector for use with an electrical receptacle having a receptacle body, the arc protector comprising:

a motion detector mounted in the receptacle body, the motion sensor detecting movement of at least one blade of a plug engaged with the receptacle and outputting a signal in response thereto, the motion detector comprising a linear potentiometer with a wiper output that is physically interfacable with the at least one of the blades when inserted in the respective receptacle such that movement of the wiper causes a change in a voltage output;

an extraction detector operatively connected to the motion sensor, the extraction detector generating a signal in response to movement of the at least one blade in a direction of extraction;

a position detector operatively connected to the sensor for determining the position of at least one of the blades in the receptacle;

a switch operatively connected to the extraction detector and the position detector, wherein the extraction detector and switch are operative to de-energize the receptacle in less than six milliseconds when the extraction detector detects extraction of the at least one blade from the receptacle; and a shunt operatively connected to the switch, the shunt dissipating load energy when the switch de-energizes the receptacle.

10. The arc protector of claim 9, wherein the switch comprises one of MOSFET and IGBT transistors.

11. The arc protector of claim 9, wherein the shunt comprises a metal oxide varistor connected across the transistors.

12. The arc protector of claim 9 further comprising an insertion sensor, the insertion sensor detecting a position of at least one of the blades of the plug in the receptacle and inhibiting the switch until the at least one blade is inserted at or past a predetermined position.

13. An arc protector for an electrical receptacle comprising:

a sensor, the sensor determining movement of a plug having blades received in the receptacle;

a first detector operatively connected to the sensor, the first detector generating a signal in response to movement of at least one of the blades at a predetermined rate;

a second detector operatively connected to the sensor for determining the position of a plug blade in the receptacle;

a zero voltage crossing detector, the zero voltage crossing detector preventing current surges upon insertion of the blades in the receptacle;

a switch operatively connected to the first and second detector, the switch de-energizing the receptacle when 1) the first detector detects extraction of the blade from the receptacle at a rate equal to or greater than the predetermined rate or 2) when the second detector detects movement of the blade past a predetermined position in the receptacle; and a shunt connected to the switch, the shunt dissipating load energy when the switch de-energizes the receptacle.

14. The arc protector of claim 13 wherein the electrical plug has three prongs, comprised of a neutral blade, a hot blade and a ground blade, wherein the hot and neutral blades are associated with the hot and neutral terminals of an AC supply and the ground is adaptable to be connected to earth ground, and wherein the at least one blade of which movement is detected by the motion sensor comprises the neutral blade.

15. The arc protector of claim 14, wherein the switch is operable to selectively connect the hot blade to the AC supply.

16. The arc protector of claim 14, wherein the neutral blade is polarized relative to the hot blade and the receptacle is configured to require the neutral blade to be inserted in a selected one of a plurality of slots formed in the receptacle.

17. The arc protector of claim 14 wherein the second detector is operable to detect a position of at least one of the blades and to inhibit the switch until the at least one blade is inserted at or past a predetermined position.

* * * * *